United States Patent
Straub, Jr. et al.

(10) Patent No.: US 11,619,527 B2
(45) Date of Patent: Apr. 4, 2023

(54) ULTRASONIC TRANSDUCER WITH A SEALED 3D-PRINTED MINI-HORN ARRAY

(71) Applicant: Micro Motion, Inc., Boulder, CO (US)

(72) Inventors: Henry Charles Straub, Jr., Sugar Land, TX (US); Alex Mezheritsky, Brooklyn, NY (US); Kerry Dwayne Groeschel, Houston, TX (US)

(73) Assignee: Micro Motion, Inc., Boulder, CO (US)

( * ) Notice: Subject to any disclaimer, the term of this patent is extended or adjusted under 35 U.S.C. 154(b) by 1221 days.

(21) Appl. No.: 16/149,068

(22) Filed: Oct. 1, 2018

(65) Prior Publication Data
US 2020/0103262 A1 Apr. 2, 2020

(51) Int. Cl.
| | |
|---|---|
| *B06B 1/06* | (2006.01) |
| *G01F 15/00* | (2006.01) |
| *G10K 11/02* | (2006.01) |
| *G01F 1/66* | (2022.01) |
| *B33Y 80/00* | (2015.01) |

(52) U.S. Cl.
CPC .......... *G01F 1/662* (2013.01); *B06B 1/0622* (2013.01); *G01F 15/006* (2013.01); *G10K 11/025* (2013.01); *B06B 2201/55* (2013.01); *B33Y 80/00* (2014.12)

(58) Field of Classification Search
CPC ........ G01F 1/662; G01F 15/006; G01F 15/14; B06B 1/0622; B06B 2201/55; B06B 1/06; B33Y 80/00; B33Y 10/00; B22F 10/20; B22F 10/00; G01K 11/025; Y02P 10/25
USPC ....................................................... 310/334
See application file for complete search history.

(56) References Cited

U.S. PATENT DOCUMENTS

| | | | | |
|---|---|---|---|---|
| 4,297,607 A | * | 10/1981 | Lynnworth | ............. B06B 1/067 310/334 |
| 5,460,047 A | * | 10/1995 | Jacobson | ................ G01F 1/662 73/632 |
| 5,539,965 A | | 7/1996 | Safari et al. | |
| 5,808,967 A | | 9/1998 | Yu et al. | |
| 5,836,192 A | | 11/1998 | Getman et al. | |
| 6,384,516 B1 | | 5/2002 | Fraser | |

(Continued)

FOREIGN PATENT DOCUMENTS

| | | |
|---|---|---|
| DE | 102007037512 A1 | 2/2009 |
| EP | 1337998 B1 | 8/2008 |

OTHER PUBLICATIONS

PCT/US2016/021471 International Search Report and Written Opinion dated May 27, 2016 (16 p.).

*Primary Examiner* — Jacques M Saint Surin
(74) *Attorney, Agent, or Firm* — The Ollila Law Group LLC

(57) ABSTRACT

A flow meter includes a pair of ultrasonic transducers. Each transducer includes a housing, a piezoelectric crystal disposed within the housing, and a mini-horn array coupled to the housing. The mini-horn array, which may be formed via a 3D printing technique, includes an opening-free enclosure, a closed cavity inside the enclosure, and a plurality of horns enclosed within the closed cavity. The horns include a horn base portion adjacent to a proximal end surface of the cavity and a horn neck portion that extends from the base portion in a direction away from the piezoelectric crystal and towards a distal end surface of the cavity. The horn neck portions are separated by spaces within the cavity, wherein the spaces between the horn necks may be filled with powder.

19 Claims, 8 Drawing Sheets

(56) References Cited

U.S. PATENT DOCUMENTS

| | | |
|---|---|---|
| 6,865,140 B2 | 3/2005 | Thomenius et al. |
| 7,052,464 B2 | 5/2006 | Wodnicki |
| 7,353,056 B2 | 4/2008 | Hazard et al. |
| 7,703,337 B1 * | 4/2010 | Feller .................. G01F 1/662 73/861.27 |
| 7,954,387 B1 * | 6/2011 | Furlong .................. G01F 1/74 73/861.28 |
| 8,009,513 B2 | 8/2011 | LaWhite et al. |
| 8,181,533 B2 * | 5/2012 | Allen .................. G01F 1/662 73/861.27 |
| 8,351,295 B2 | 1/2013 | LaWhite et al. |
| 9,295,923 B2 * | 3/2016 | Mezheritsky ............ B01B 1/00 |
| 9,506,790 B2 | 11/2016 | Mezheritsky |
| 9,541,431 B2 * | 1/2017 | Nakano .................. G01F 1/66 |
| 2005/0066744 A1 | 3/2005 | Kupnik et al. |
| 2007/0046108 A1 | 3/2007 | Pearson et al. |
| 2009/0235501 A1 | 9/2009 | Straub, Jr. et al. |
| 2012/0125121 A1 | 5/2012 | Gottlieb et al. |
| 2016/0282160 A1 | 9/2016 | Mezheritsky |
| 2017/0307426 A1 | 10/2017 | Van Klooster et al. |

* cited by examiner

ULTRASONIC TRANSDUCER WITH A SEALED 3D-PRINTED MINI-HORN ARRAY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Field of the Disclosure

This disclosure relates generally to ultrasonic flow meters and particularly to transducer assemblies used in ultrasonic flow meters. More specifically, this disclosure relates to matching layer structures for modifying the transmission of acoustic energy to and from transducer assemblies.

Background to the Disclosure

Fluids, such as natural gas, are transported from place to-place via pipelines. It is desirable to know with accuracy the amount of fluid flowing in the pipeline, and particular accuracy is demanded when the fluid is changing hands, or "custody transfer." Even where custody transfer is not taking place, however, measurement accuracy is desirable, and in these situations flow meters may be used.

Ultrasonic flow meters are one type of flow meter that may be used to measure the amount of fluid flowing in a pipeline. Ultrasonic flow meters have sufficient accuracy to be used in custody transfer, for example. In an ultrasonic flow meter, acoustic signals are sent back and forth across the fluid stream to be measured. Based on parameters of received acoustic signals, the fluid flow velocity in the flow meter is determined. The volume of fluid flowing through the meter can be determined from computed flow velocities and the known cross-sectional area of the flow meter. The ultrasonic flow meter includes transducers that generate and detect the acoustic signals.

Certain ultrasonic transducers utilize a mini-horn array as an impedance matching layer. The mini-horn array is a set of spaced-apart horn-shaped structures, which may be called "horns," extending between a pair of plates. The plates are acoustically coupled to a piezoelectric crystal on one side and the fluid within the ultrasonic flow meter on the other side. The mini-horn array provides acoustic impedance matching between the piezoelectric crystal and the fluid.

Known mini-horn arrays include gaps or passageways to allow pressure equalization between the array and the fluid that is passing through the meter. In some instances, the gaps between the horns in the mini-horn array may be filled with a high-viscosity, low compressibility material such as wax or grease.

Ultrasonic transducers in ultrasonic flow meters are used to make extremely accurate measurements of the time required for sound energy to cross the meter so as to determine the flow velocity of fluid though the meter, a value that is then used to determine the total flow rate through the meter. Any error in the timing measurement will result in an error in the measured flow rate. Because ultrasonic flow meters are often used for custody transfer, such as in the buying/selling of petroleum products, any error in flow rate measurement can result in lost money. One drawback with conventional mini-horn arrays is that foreign matter that becomes present within the mini-horn array will cause a shift in the timing measurement ultimately resulting in errors in the flow rate measurement. This is a problem because pipelines are typically not clean. In gas pipelines, there is often contamination from oils, water, and particulates. Over time, these contaminates may accumulate within the mini-horn array resulting in timing shifts that will cause an error in the flow rate measurement. Even with the array initially full of a high-viscosity material, such as grease, over time as the temperature and pressure within pipeline change, this high-viscosity material can work its way out of the array, resulting in timing shifts (and inaccurate measurements) due to either the high-viscosity material being missing or having been replaced by the contaminates.

Further, the manufacturing of the mini-horn array can be time consuming and expensive. Machining of the mini-horn array is particularly time consuming because of the large quantity of small holes/gaps that must be made.

The conventional mini-horn array can be made via a 3-D printing technique but there are still the drawbacks that the process can add significant time and expense. One method of 3-D printing is direct metal laser sintering (DMSL). A thin layer of metal powder (such as titanium, Inconel, or stainless steel) is deposited. A laser is then used to selectively heat and fuse (sinter) the powder at all points in which solid material is desired. A new layer of powder is then deposited and selectively sintered using the laser. This process is repeated until the entire mini-horn array has been built up. However, the un-sintered powder must then be removed from the array. Removing the powder from the array through the gaps can be extremely time-consuming. If it is then desired to fill the array with a high viscosity material, it can take still further time to ensure the array is uniformly filled with the high-viscosity material.

SUMMARY OF THE DISCLOSURE

Embodiments disclosed herein offer improvements to the ultrasonic flow meter and transducers by employing a mini-horn array transducer that completely isolates the interior of the mini-horn array from the fluid being conducted through the meter, and that may be manufactured at a lower manufacturing cost.

In an embodiment, the ultrasonic flow meter includes a meter body and a passage in the meter body for conducting flow of a fluid stream that is to be metered. In addition, the ultrasonic flow meter includes a pair of ultrasonic transducers coupled to the meter body, the transducers configured to form a chordal path across the passage between the transducers. Each transducer includes a transducer housing, a piezoelectric crystal disposed within the transducer housing, and a mini-horn array coupled to the transducer housing. The mini-horn array includes an opening-free enclosure and a closed cavity inside the enclosure. The cavity has a proximal end surface and a distal end surface. The mini-horn array also includes a plurality of horns enclosed within the closed cavity, the horns having a horn base portion adjacent to the proximal end surface of the cavity and a horn neck portion that extends from the horn base portion in a direction away from the piezoelectric crystal and towards the distal end surface of the cavity. The horn neck portions are separated by spaces within the cavity.

In another embodiment, a method of making an ultrasonic transducer includes; using a 3D printing technique, building a mini-horn array such that the mini-horn array includes horns disposed in an opening-free enclosure; and further includes attaching the mini-horn array to a transducer housing that is configured to house a piezoelectric crystal.

In some embodiments, a method of making an ultrasonic transducer includes applying a first layer of a powder to the transducer housing and causing a portion of the first layer of the powder to solidify and bond to the transducer housing, forming a first solidified layer. Still further, in some embodiments, the method includes adding subsequent layers of the powder above the first solidified layer and causing portions of the subsequent layers of the powder to solidify and bond to previously-formed solidified layers, forming subsequent solidified layers. Moreover, in some embodiments, the method includes building the array of horns within a cavity while building the subsequent solidified layers and enclosing the cavity using the 3D printing technique.

In another embodiment, a transducer assembly includes a transducer housing that includes a first end, a second end, and a channel extending between the first and second ends, and a mini-horn array that is built by a 3D printing technique and that is spaced apart from the channel and extends to the first end. In addition, the transducer assembly includes a piezoelectric crystal disposed within the channel proximal the first end of transducer housing. The mini-horn array includes an opening-free enclosure, a plurality of horns disposed within the enclosure, and powder disposed in the enclosure between the horns. The opening-free enclosure is sealed by the 3D printing technique, retaining the powder inside the cavity.

BRIEF DESCRIPTION OF THE DRAWINGS

For a detailed description of the disclosed exemplary embodiments, reference will now be made to the accompanying drawings, wherein.

NOTATION AND NOMENCLATURE

Figure 1:
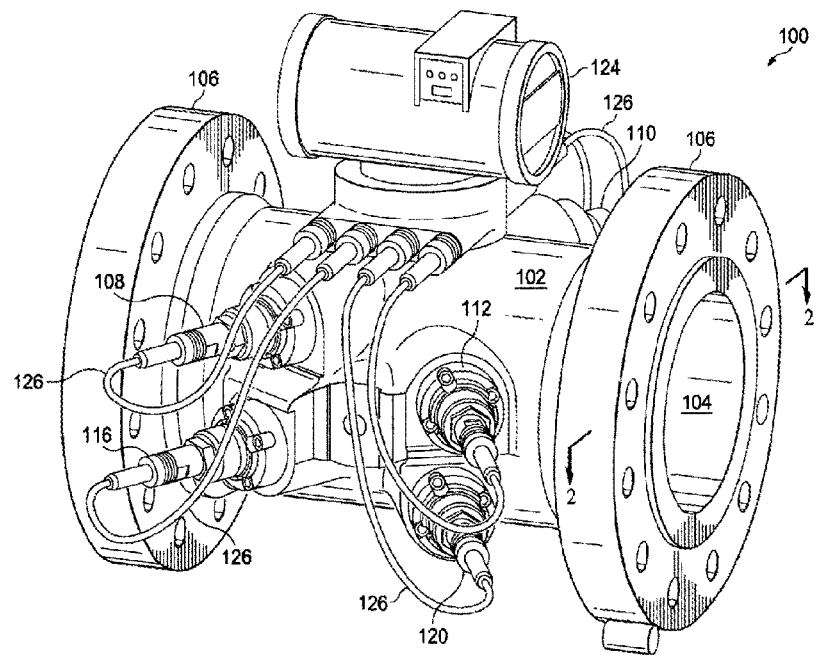
FIG. 1 shows an ultrasonic flow meter in accordance with principles disclosed herein.

The following description is exemplary of certain embodiments of the disclosure. One of ordinary skill in the art will understand that the following description has broad application, and the discussion of any embodiment is meant to be exemplary of that embodiment, and is not intended to suggest in any way that the scope of the disclosure, including the claims, is limited to that embodiment.

The figures are not drawn to-scale. Certain features and components disclosed herein may be shown exaggerated in scale or in somewhat schematic form, and some details of certain elements may not be shown in the interest of clarity and conciseness. In some of the figures, in order to improve clarity and conciseness, one or more components or aspects of a component may be omitted or may not have reference numerals identifying the features or components. In addition, within the specification, including the drawings, like or identical reference numerals may be used to identify common or similar elements.

As used herein, including in the claims, the terms "including" and "comprising," as well as derivations of these, are used in an open-ended fashion, and thus are to be interpreted to mean "including, but not limited to . . . ." Also, the term "couple" or "couples" means either an indirect or direct connection. Thus, if a first component couples or is coupled to a second component, the connection between the components may be through a direct engagement of the two components, or through an indirect connection that is accomplished via other intermediate components, devices and/or connections. The recitation "based on" means "based at least in part on." Therefore, if X is based on Y, then X may be based on Y and on any number of other factors. The word "or" is used in an inclusive manner. For example, "A or B" means any of the following: "A" alone, "B" alone, or both "A" and "B." In addition, the word "substantially" means within a range of plus or minus 10%. The word "uniform" is equivalent to the phrase "uniform or substantially uniform."

In addition, the terms "axial" and "axially" generally mean along or parallel to a given axis, while the terms "radial" and "radially" generally mean perpendicular to the axis. For instance, an axial distance refers to a distance measured along or parallel to a given axis, and a radial distance means a distance measured perpendicular to the axis. Furthermore, any reference to a relative direction or relative position is made for purpose of clarity, with examples including "top," "bottom," "up," "upper," "upward," "down," "lower," "clockwise," "left," "leftward," "right," and "right-hand." For example, a relative direction or a relative position of an object or feature may pertain to the orientation as shown in a figure or as described. If the object or feature were viewed from another orientation or were implemented in another orientation, it may then be helpful to describe the direction or position using an alternate term.

DETAILED DESCRIPTION OF THE DISCLOSED EXEMPLARY EMBODIMENTS

Various embodiments of a flow mater disclosed herein were developed in the context of measuring hydrocarbon flows (e.g., crude oil, natural gas), and the description follows from the developmental context; however, the systems and methods described are equally applicable to measurement of any fluid flow.

Metering fluid flow in extreme temperature environments presents numerous challenges. In conventional ultrasonic flow meters, the transducers include a matching layer of low-density epoxy that provides a good acoustic match between the piezoelectric element, e.g., a high density piezoelectric crystal, of the transducer and the relatively low density fluid flowing through the meter. Unfortunately, the mismatch in coefficients of thermal expansion of the piezoelectric element and the low density epoxy can cause the low-density epoxy to crack when exposed to temperature extremes, temperature cycling, and/or high pressures that are often present in the fluid measurement environment. Also, the epoxy has low chemical resistivity, particularly to the chemically aggressive components of natural gas. A cracked and/or delaminated epoxy matching layer degrades transducer performance to a degree that dictates replacement of the transducer, which in turn may require that fluid flow through the flow meter and associated pipe system be discontinued.

Embodiments of the ultrasonic transducer disclosed herein include piezoelectric element and a housing with a matching structure or layer to provide impedance matching between a piezoelectric element and the fluid flowing through the ultrasonic flow meter. Then matching structures disclosed herein are less susceptible to failure when exposed to various harsh environmental conditions. The matching structure of the present disclosure includes a mini-horn array that is printed as a monolithic structure by a 3D printing technique. In various embodiments, the mini-horn array is made of the same chemically resistant material as is the housing, such as titanium, a titanium alloy, an Inconel® alloy, or a stainless steel as examples, so that the coefficients of thermal expansions of these members are substantially equal, so these members have similar expansion and contraction. The mini-horn array includes horn-shaped structures, or simply "horns," to provide impedance matching between the piezoelectric element and the fluid flowing through the ultrasonic flow meter.

FIG. 1 shows an ultrasonic flow meter 100 in accordance with principles disclosed herein. The ultrasonic flow meter 100 includes a meter body or spool piece 102 that defines a central bore or passage 104. The spool piece 102 is designed and constructed to be coupled to a pipeline or other structure (not shown) carrying fluids (e.g., natural gas) such that the fluids flowing in the pipeline travel through the central passage 104. While the fluids travel through the central passage 104, the ultrasonic flow meter 100 measures the flow rate; hence, the fluid may be referred to as the measured fluid. The spool piece 102 includes flanges 106 that facilitate coupling of the spool piece 102 to another structure. In other embodiments, any suitable system for coupling the spool piece 102 to a structure may be equivalently used (e.g., weld connections).

In order to measure fluid flow within the spool piece 102, the ultrasonic flow meter 100 includes a plurality of transducer assemblies. In the view of FIG. 1 five such transducers assembles 108, 110, 112, 116, and 120 are in view. The transducer assemblies are paired (e.g., transducer assemblies 108 and 110), as will be further discussed below. Moreover, each transducer assembly is electrically coupled to the control electronics package 124 by way of a respective cable 126 or an equivalent signal conducting assembly or wireless communication method.

Figure 2:
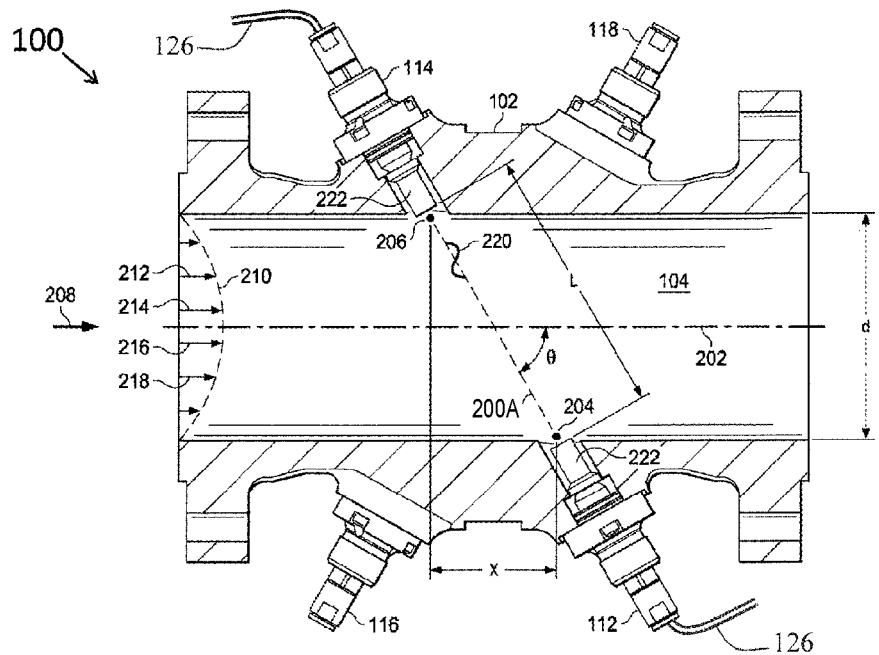
FIG. 2 shows a cross-sectional overhead view of the ultrasonic flow meter shown in FIG. 1.

FIG. 2 shows a cross-sectional overhead view of the ultrasonic flow meter 100 taken substantially along line 2-2 of FIG. 1. Spool piece 102 has a predetermined size and defines the central passage 104 through which the measured fluid flows. An illustrative pair of transducer assemblies 112 and 114 is located along the length of spool piece 102. Transducer assemblies 112 and 114 include acoustic transceivers, and more particularly include ultrasonic transducer assemblies 222 operating alternately as a transmitter and receiver. The ultrasonic transducer assemblies 222 both generate and receive acoustic signals having frequencies above about 20 kilohertz.

The acoustic signals may be generated and received by a piezoelectric element in each transducer assembly 222. To generate an ultrasonic signal, the piezoelectric element is stimulated electrically by way of a signal (e.g., a sinusoidal signal) transmitted through cable 126, and the element responds by vibrating. The vibration of the piezoelectric element generates the acoustic signal that travels through the measured fluid to the corresponding transducer assembly of the pair. Similarly, upon being struck by an acoustic signal, the receiving piezoelectric element vibrates and generates an electrical signal (e.g., a sinusoidal signal) that is detected, digitized, and analyzed by the electronics associated with the flow meter 100 (e.g., the control electronics 124).

Continuing to reference FIG. 2, a path 200A, also referred to as a "chord," exists between illustrative transducer assemblies 112 and 114 at a non-perpendicular angle θ (theta) to a central bore centerline 202. The length of chord 200A is the distance L between the face of transducer assembly 112 and the face of transducer assembly 114. Points 204 and 206 define the locations where acoustic signals generated by transducer assemblies 112 and 114 enter and leave fluid flowing through the spool piece 102. The position of transducer assemblies 112 and 114 may be defined by the angle θ, by the cord length L measured between the faces of the transducer assemblies 112 and 114, a second length X corresponding to the axial distance between points 204 and 206, and a third length d corresponding to the pipe inside diameter. In most cases distances d, X, and L are precisely determined during flow meter fabrication. A measured fluid, such as natural gas, flows in a direction 208 with a velocity profile 210. Velocity vectors 212, 214, 216 and 218 illustrate that the gas velocity through spool piece 102 increases toward the centerline 202 of the spool piece 102.

Initially, downstream transducer assembly 112 generates an ultrasonic signal that is incident upon, and thus detected by, upstream transducer assembly 114. Sometime later, the upstream transducer assembly 114 generates a return ultrasonic signal that is subsequently incident upon, and detected by, the downstream transducer assembly 112. Thus, the transducer assemblies exchange or play "pitch and catch" with ultrasonic signals 220 along chordal path 200. During operation, this sequence may occur thousands of times per minute.

The transit time of an ultrasonic signal 220 between illustrative transducer assemblies 112 and 114 depends in part upon whether the ultrasonic signal 220 is traveling upstream or downstream with respect to the fluid flow. The transit time for an ultrasonic signal traveling downstream (i.e., in the same direction as the fluid flow) is less than its transit time when traveling upstream (i.e., against the fluid flow). The upstream and downstream transit times can be used to calculate the average velocity along the signal path, and the speed of sound in the measured fluid. Given the cross-sectional measurements of the flow meter 100 carrying the fluid, the average velocity over the area of the central passage 104 may be used to find the volume of fluid flowing through the spool piece 102.

Figure 3:
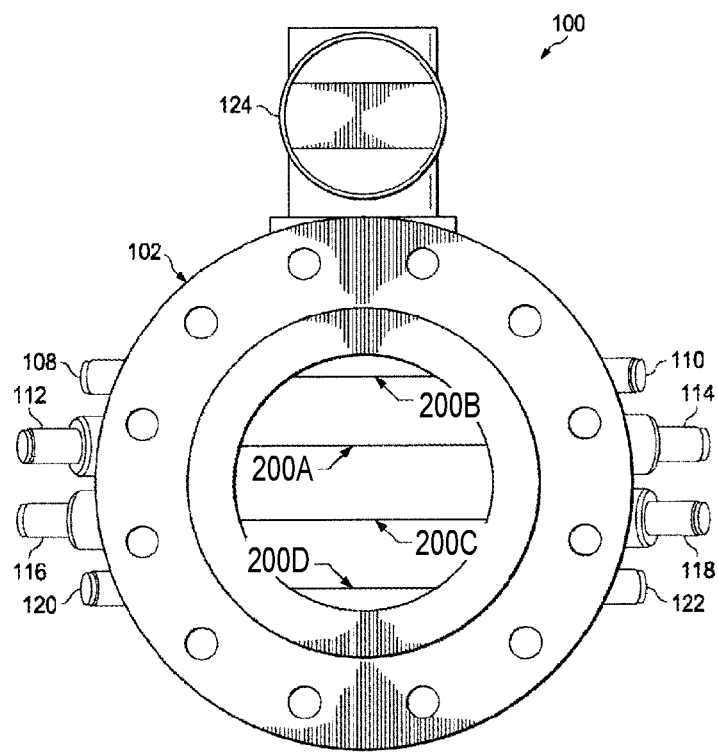
FIG. 3 shows an end elevation view of the ultrasonic flow meter shown in FIG. 1.

Ultrasonic flow meters can have one or more chords, e.g., one chord for each pair of facing transducer assemblies. FIG. 3 illustrates an end elevation view of ultrasonic flow meter 100. In particular, illustrative ultrasonic flow meter 100 comprises four chordal paths 200A, 200B, 200C and 200D at varying elevations within the spool piece 102. Each chordal path 200A-D corresponds to a transducer pair operating alternately as a transmitter and receiver. As explained with respect to FIG. 2, transducer assemblies 112 and 114 define a chordal path 200A. Transducer assemblies 108 and 110 define a chordal path 200B. Transducer assemblies 116 and 118 define a chordal path 200C. Finally, transducer assemblies 120 and 122 define a chordal path 200D.

Figure 4:
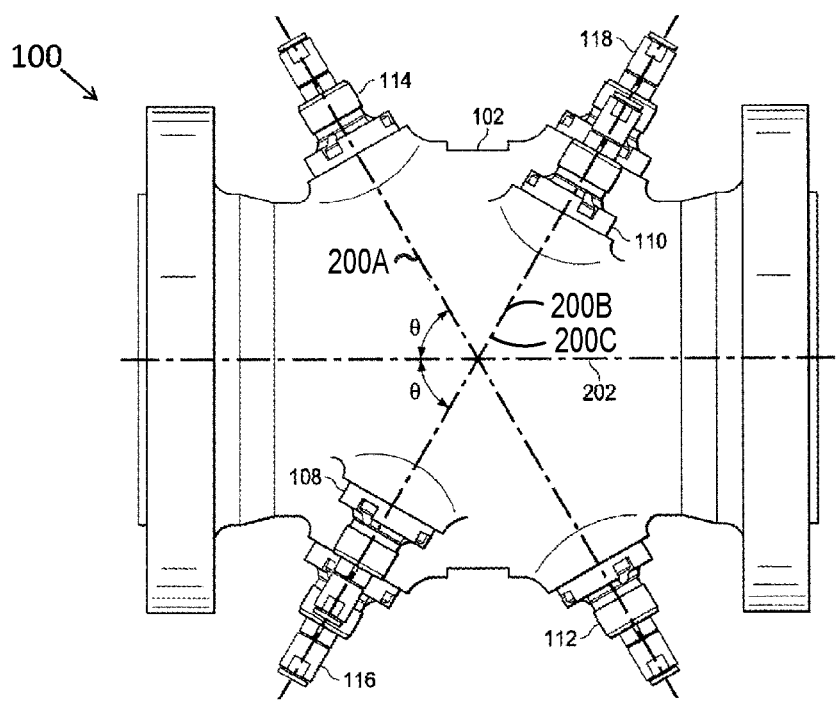
FIG. 4 shows an arrangement of transducer pairs for the ultrasonic flow meter shown in FIG. 1.

A further aspect of the arrangement of the four pairs of transducer assemblies is shown with respect to FIG. 4, which shows an overhead view. Each transducer assembly pair corresponds to a single chordal path of FIG. 3, and, as shown in FIG. 4, the pairs of transducer assemblies are mounted such that each chordal path 200A-D is disposed at a non-perpendicular angle with respect to the center line 202. For example, as explained with respect to FIG. 2, a first pair of transducer assemblies 112 and 114 is mounted at a non-perpendicular angle θ to centerline 202 of spool piece 102. Another pair of transducer assemblies 108 and 110 is also mounted at a non-perpendicular angle θ to centerline 202 so that their chordal path 200B loosely forms the shape of an "X" with respect to the chordal path 200A of transducer assemblies 112 and 114. Similarly, transducer assemblies 116 and 118 are placed parallel to transducer assemblies 108 and 110 and their chordal path 200B, but at a different "level" or elevation. Not explicitly shown in FIG. 4 is the fourth pair of transducer assemblies 120 and 122, having the chordal path 200D, which is parallel to transducer assemblies 112 and 114 and their chordal path 200A and forms an "X" with respect to the chordal paths 200B and 200C. Thus, considering FIGS. 2, 3 and 4, the transducer assembly pairs may be arranged such that the upper two pairs of transducer assemblies corresponding to chords 200A and 200B form an the shape of an "X", and the lower two pairs of transducer assemblies corresponding to chords 200C and 200D also form the shape of an "X". The flow velocity of the fluid may be determined at each chord 200A-D to obtain chordal flow velocities, and the chordal flow velocities are combined to determine an average flow velocity over the entire pipe. From the average flow velocity, the rate or amount of fluid flowing in the spool piece, and thus the pipeline, may be determined.

Typically, control electronics (e.g., control electronics package 124) cause the transducer assemblies 222 to activate, receive the output of the transducers, compute the mean flow velocity for each chord, compute the mean flow velocity for the meter, compute the volumetric flow rate through the meter, and perform meter diagnostics. The volumetric flow rate and possibly other measured and computed values, such as flow velocity and speed of sound, are then output to additional devices, such as a flow computer, that are external to the meter 100.

Figure 5:
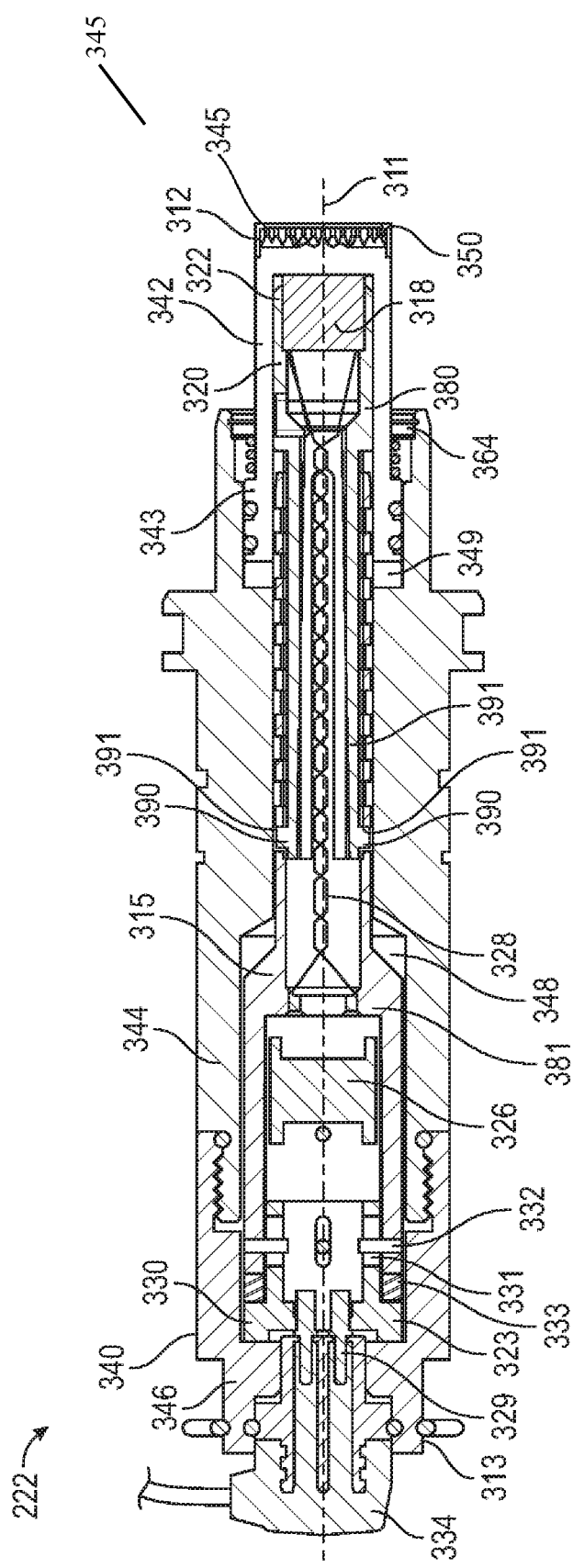
FIG. 5 shows a cross-sectional view of a transducer assembly for use in the ultrasonic flow meter of FIG. 2 in accordance with principles described herein.
Figure 6:
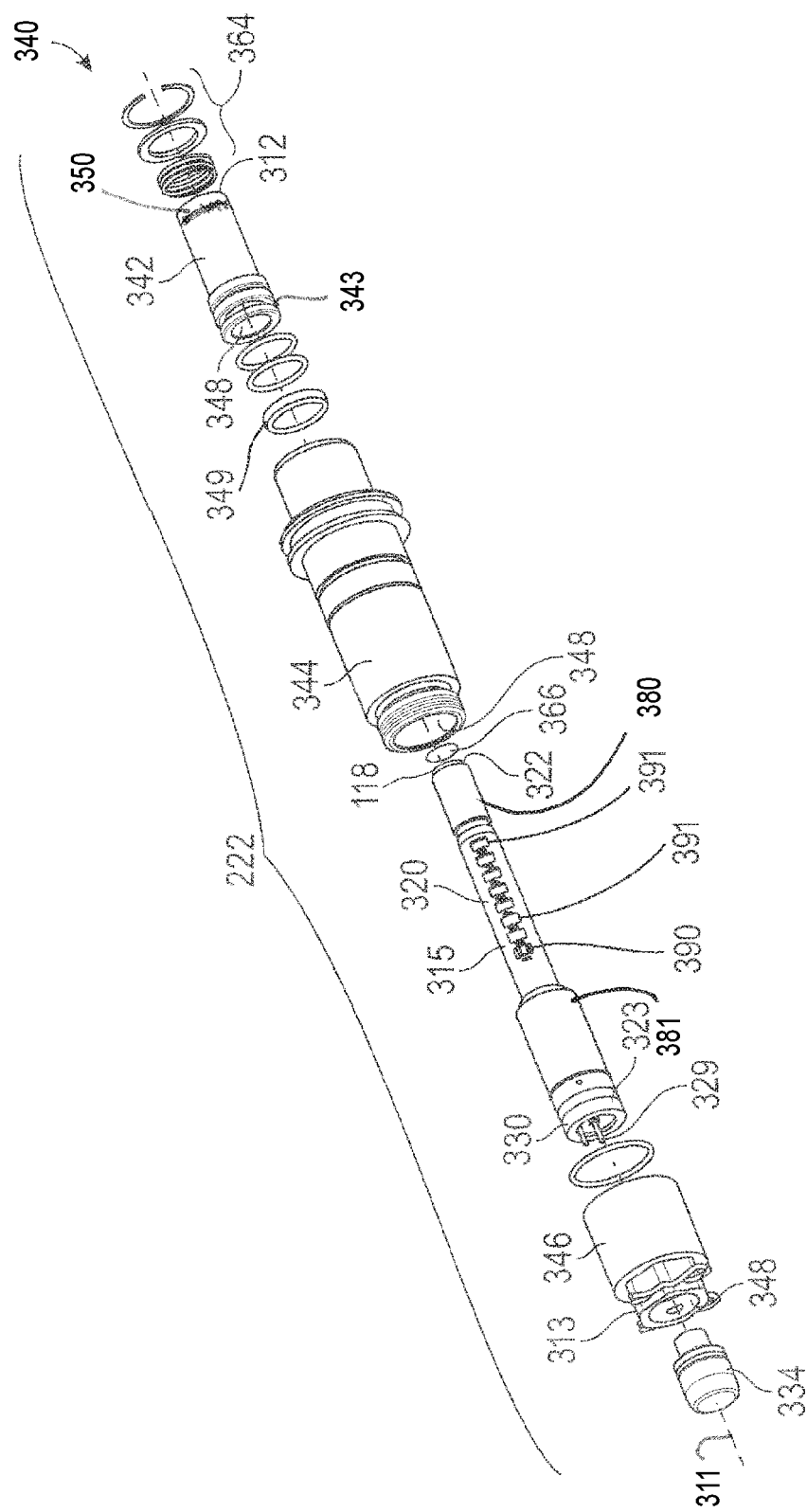
FIG. 6 shows an exploded view in perspective of the transducer assembly of FIG. 5.

FIG. 5 and FIG. 6 present closer views of transducer assembly 222 that may be included in a transducers assembly 108, 110, 112, 114, 116, 118, 120, or 122 for flow meter 100. Transducer assembly 222 has a central axis 311 and extends between a first or leading end 312, which is to be disposed proximal or within the through passage 104 (FIG. 2), and a second or trailing end 313, spaced apart from end 312 and intended to be located outside the through passage 104 and outside spool piece 102. Transducer assembly 222 includes a piezoelectric capsule 315 sealed within a transducer housing 340. Capsule 315 includes a piezoelectric element or crystal 318 located adjacent leading end 312. For simplicity, transducer assembly 222 having piezoelectric capsule 315 may be called an ultrasonic transducer. Piezoelectric capsule 315 includes an elongate body 320 extending along central axis 311 from a first end 322 to a second end 323, a transformer 326 located within body 320 proximal second end 323, and an end cap 330 at second end 323. Transformer 326 is axially spaced from piezoelectric crystal 318. A plurality of conductors 328 extends through the body 320 and electrically couples the crystal 318 with transformer 326. A plurality of conductor pins 329 held in the end cap 330 are electrically coupled between transformer 326 and a removable cord set or cable connector 334. End cap 330 includes axially-extending slots 331 in a sidewall that receives pins 332 extending radially inward from body 320. A resilient member 333 is captured between end cap 330 and body 320. Arranged in this manner, cap 330 is configured to move axially a prescribed distance (e.g., the axial length of slots 331) relative to pins 332 and body 320, being biased away from body 320 by resilient member 333. With this mounting of cap 330 to body 320, piezoelectric capsule 315 is extendable to firmly but gently hold transformer 326 inside body 315 with piezoelectric crystal 318 pressed toward or against outer housing 340 at end 312. Resilient member 333 is, as examples, a coiled spring or a wave spring.

Continuing to reference FIG. 5 and FIG. 6, outer housing 340 includes a tubular front cap 342 extending from leading end 312, a tubular body or stalk 344, and a cord retainer or transducer retainer 346 extending to trailing end 313, and a multi-diameter channel or bore 348 that extends through retainer 346, stalk 344, and cap 342. Housing 340 or various members of housing 340 may be generally cylindrical and composed of metal, for example. For example, housing 340 may be formed from metals such as titanium, a titanium alloy, an Inconel® alloy, or a stainless steel, as examples. Cap 342 extends along axis 311 from a sealing end 343 to a distal end 345, which corresponds to end 312 of transducer assembly 222. Cap 342 includes a mini-horn array 350 at its distal end 345. Front cap 342 may also be called a matching tip, and within this structure, the mini-horn array 350 of cap 342 serves as a monolithic matching layer for acoustic impedance matching between the high impedance piezoelectric crystal 318 and low impedance fluid flowing in the central passage 104. The front cap 342, including mini-horn array 350, may be formed of metal, examples of which are stated above. In various embodiments, cap 342 is a monolithic structure.

In the assembly of FIG. 5, piezoelectric capsule 315 is received within bore 348 and resides within retainer 346, stalk 344, and cap 342. Transducer retainer 346 is threadingly received on stalk 344 opposite the leading end 312. Cable connector 334 is held within retainer 346. End 343 of front cap 342 is sealingly engaged within stalk 344 and is disposed against an isolation spacer 349. Front cap 342 and spacer 349 are held within stalk 344 by various retaining members 364 that include an isolation spring, an isolation washer, and a retaining ring. Best shown in FIG. 6, an interface disc 366 is located between piezoelectric crystal 318 and the inner surface of front cap 342 at leading end 312. In this embodiment, interface disc 366 is electrically insulating and is made from DuPont™ Kapton® polyimide film. Some embodiments use another material while still others lack an interface disc 366.

In the example of FIG. 5 and FIG. 6, the length of piezoelectric capsule 315 is adjustable. Body 320 of capsule 315 includes a first member 380 installable and removable from second member 381. The position of member 380 relative to member 381 is adjustable and latchable, to change the axial length of body 320 by a latch tab 390 or a plurality of latch tabs 390 received in various apertures 391. Some embodiments include a piezoelectric capsule lacking a first member installable and removable from second member with a latch tab or a pair of latch tabs received in any of various apertures for adjustable length.

Figure 7:
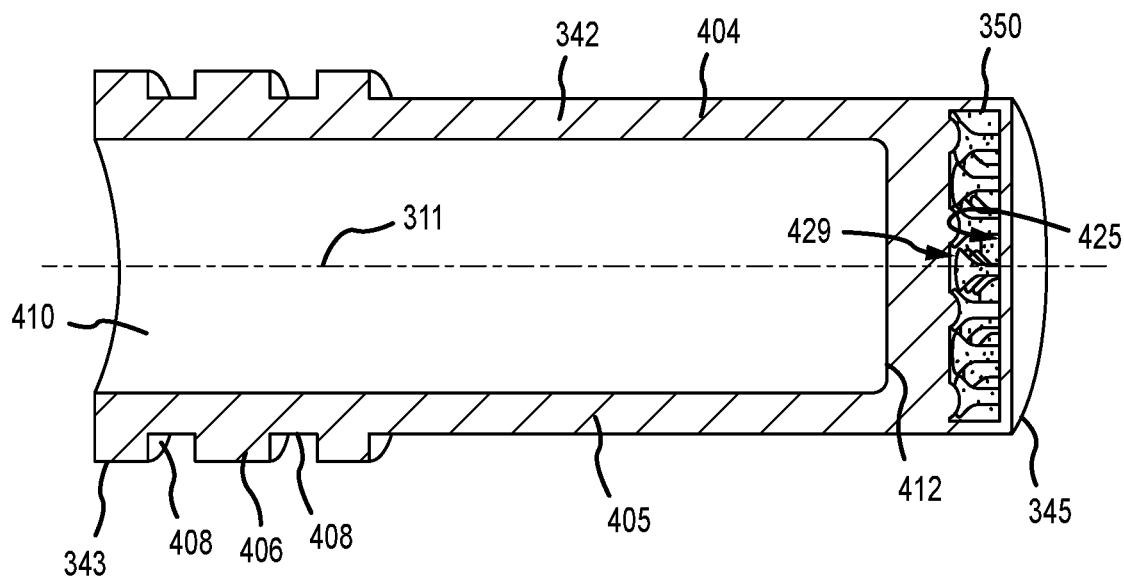
FIG. 7 is a cross sectional view showing a front cap and its mini-horn array from the transducer assembly of FIG. 5.

FIG. 7 provides a closer view of front cap 342 and its mini-horn array 350, which is disposed at distal end 345, both extending along axis 311. In addition, cap 342 includes a tubular body 404 extending axially from mini-horn array 350 to sealing end 343. Cap body 404 includes a neck 405 coupled to array 350, an enlarged section 406 extending from neck 405 to end 343, a plurality of external grooves 408 within section 406, and a bore or cylindrical chamber 410 that extends inward through end 343, into neck 405 and toward array 350. Grooves 408 are configured to receive seals, such as O-rings. Thus, disposed within body 404, chamber 406 is open at end 343 and includes a closed end 412. Chamber 410 forms a part of multi-diameter bore 348 in housing 340 that receives piezoelectric crystal 318 (FIG. 5).

Figure 8:
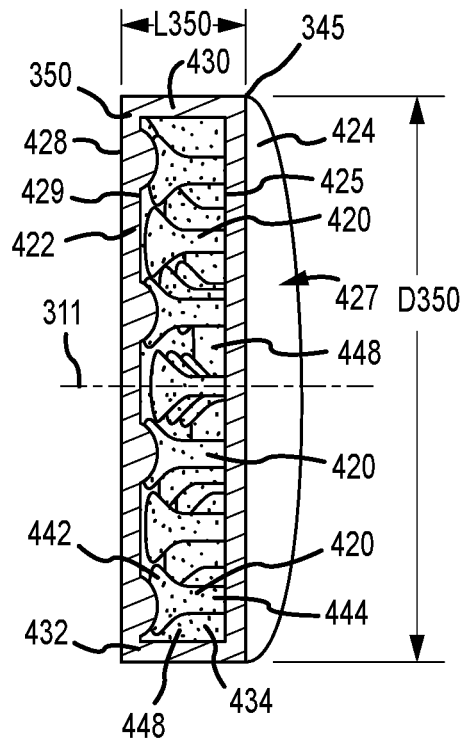
FIG. 8 is a cross sectional view showing the mini-horn array of the front cap of FIG. 7.

FIG. 8 shows a cross-sectional view of mini-horn array 350 for front cap 342. Mini-horn array 350 is generally cylindrical, disposed about a central or longitudinal axis 311, and includes a plurality of horns 420 extending from a base or back plate 422 to a front plate 424, which is disposed at end 345. Back plate 422 extends axially from a first end 428 to a second end 429, opposite the first end. Front plate 424, which is spaced apart from back plate 422 along axis 311, includes a first end 425 and a second end or an outer surface 427. As included in FIG. 8, horns 420 are round, tapering structures that are generally shaped like a straight bugle. The horns 420 are solid in various embodiments. An annular wall 430 extends axially between plates 422, 424 and surrounds horns 420. Wall 430 and plates 422, 424 form an opening-free enclosure 432 having a closed cavity 434 that contains horns 420. Cavity 434 of enclosure 432 extends axially from surface 429 on back plate 422 to first end 425 of front plate 424, opposite the outer surface 427. The internal, second end 429 of back plate 422 includes and may be called a proximal end surface 429 for the enclosure 432 and its cavity 434. The internal, first end 425 on front plate 424 may also be called a distal end surface 425 for the enclosure 432 and its cavity 434. In this context, proximal and distal are relative to the closed end 412 of chamber 410 inside cap 342 (FIG. 7) that receives piezoelectric crystal 318 (FIG. 5). Continuing to reference FIG. 8, the diameter D350 of the mini-horn array 350 may be, for example, approximately one inch. The back plate 422 may be, for example, approximately 0.15 inches thick, along axis 311. The front plate 424 may be approximately 0.03 inches thick, along axis 311, and the length L350 of array 350 may be 0.28 inches, as an example.

Continuing to reference FIG. 8, a horn 420 includes a horn base portion 442 adjacent to the proximal end surface 429 of enclosure 432 and a horn neck 444 portion that extends from the horn base portion 442 in a direction away from proximal end surface 429 and towards the distal end surface 425 of enclosure 432. In transducer assembly 222 of FIG. 5, base portion 442 of horn 420 is disposed proximal the piezoelectric crystal 318. In general, in the embodiment shown in FIG. 8, horn base portion 442 expands in diameter as it extends towards front plate 424, and neck 444 either continues this expansion at a reduced rate or has a constant diameter. The horn neck portions 444 of adjacent horns 420 are spaced apart, separated by spaces within the cavity 434, and in this example, the full length of horns 420 are spaced apart, separated from adjacent horns 420 by spaces within the cavity 434, thus the bases portions 442 are spaced apart.

The mini-horn array 350 may include, for example, 12 to 100 of the horns 420. The plurality of horns 420 and front plate 424 provide an effective acoustical working area matching layer. Within this range, some embodiments include 30 to 45 horns. The mini-horn array 350 may be designed to operate with a working frequency for the piezoelectric crystal 318 in a range of 50-500 kilohertz, and acoustical impedance in a range 0.1-7 MRayls, as examples. Within this range, some embodiments use a working frequency of 125 MHz. Each horn 420 includes a base adjacent the back plate 422 and a neck extending from the base and adjacent to the front plate 424. The transverse cross sectional area of the neck is smaller than the transverse cross sectional area of the base. Embodiments of the mini-horn array 350 may include horns 420 having various shapes, such as the shapes of the horns in the mini-horn arrays described in U.S. Pat. No. 9,506,790, filed Mar. 24, 2015, and entitled "Transducer Mini-Horn Array for Ultrasonic Flow Meter," which is hereby incorporated herein by reference in its entirety for all purposes.

Referring to FIG. 7 and FIG. 8, mini-horn array 350 is entirely built by an additive manufacturing process, which may also be called a three dimensional (3D) printing process and includes a 3D printing technique or a plurality of 3D printing techniques or steps. Examples of 3D printing techniques include planning the building process, depositing thin layers of powder, and heating a portion or the entire deposited layer. The powder may be called powdered material or build material. The term 3D printing technique may also refer to the 3D printing process as a whole. The 3D printing process for fabricating mini-horn array 350 may include a single set-up or single session of a 3D printer. E.g., in some examples, the entire mini-horn array 350 of FIG. 8 is printed before any of it is removed from the 3D printer. For some embodiments, first end 428 of back plate 422 is built directly onto cap body 404 of FIG. 7 by a 3D printing technique. In some examples, mini-horn array 350 is formed by a 3D printing technique and is subsequently attached to a front cap body 404 by welding, bonding, brazing, applying an epoxy, diffusion bonding, or another suitable technique to build a front cap, such as front cap 342 of FIG. 7.

The 3D printing technique for mini-horn array 350 may include depositing layer after layer of a bondable or fusible, powder. The 3D printing may start, for example, by building first end 428 of back plate 422 as the base or bottom fused surface for fabrication. Each layer of powder may be heated by a focused laser or by a heat lamp, either of which may fuse all or a portion of the current layer. One such 3D printing technique is direct metal laser sintering (DSMI). For some embodiments, back plate 422 is formed first, layer-by-layer, horns 420 and wall 430 are built together layer-by-layer, and finally front plate 424 if formed layer-by-layer. For some embodiments, wall 430 surrounds of back plate 422 and front plate 424 so that wall 430 spans the axial lengths of back plate 422 and front plate 424 as well as the axial length of the horns 420. For any of these embodiments, it may be said that wall 430 is built simultaneously with back plate 422, front plate 424, and horns 420 using the 3D printing technique. The 3D printing technique forms the opening-free enclosure 432 that is entirely sealed, e.g., hermetically sealed, against intrusion or loss of gas, solid, or liquid, which stabilizes the acoustic performance of mini-horn array 350 as a matching layer for a transducer assembly 222. Thus, back plate 422, front plate 424, horns 420, and wall 430 are all built during the same 3D printing technique or process. Enclosure 432 is sealed during the 3D printing after starting or upon completing front plate 424. Within cavity 434 the spaces between horns 420 are filled with loose or unfused powder 448, which is a portion of the same build material that was deposited layer-upon-layer. The presence of unfused powder 448 between plates 422, 424 and between horns 420 within the closed enclosure 432 may provide beneficial acoustic transmission or coupling characteristics within leading end 312, between transducer crystal 318 and a fluid that may flow in passage 104 of flow meter 100 (FIG. 2). It would also be feasible to use a 3D printing technique that builds front plate 424 as the base or bottom surface for fabrication before building horns 420 and back plate 422. Other orientations are possible during manufacturing. The uniformity of the type of material (fused and unfused) throughout mini-horn array 350 may be beneficial to the structural and acoustic performance of array 350 as a matching layer for a transducer assembly 222. For example, the presence of the unfused metal powder in array 350 may dampen unwanted acoustic ringing or vibration in array 350 and provides array 350 with a fill material that has the same or substantially similar coefficient of thermal expansion as enclosure 432. Building the array 350 as an opening-free unit in this manner and leaving unfused metal powder inside enclosure 432 reduces manufacturing costs associated with removing the unfused powder and the additional step of adding a separate ring to enclose the mini-horn array.

Figure 9:
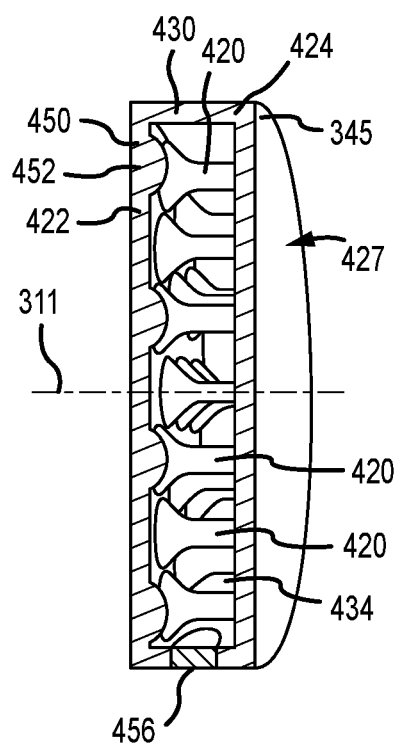
FIG. 9 is a cross sectional view showing another embodiment of a mini-horn array that is compatible with the front cap of FIG. 7 in accordance with principles disclosed herein.

The embodiment of FIG. 9 is a mini-horn array 450, which includes all the features of mini-horn array 350, except, array 450 lacks unfused powder. Mini-horn array 450 includes, for example, an enclosure 452 formed by a back plate 422, a front plate 424, and an annular wall 430. Enclosure 452 includes a closed cavity 434 that contains a plurality of horns 420 extending from a back plate 422 to a front plate 424. Horns 420 are spaced apart from each other, as previously described. Mini-horn array 450 may be formed by the same 3D printing process/technique as mini-horn array 350, creating enclosure 452 as an opening-free enclosure. Subsequent manufacturing steps may include drilling a hole or a plurality of holes or apertures through wall 430 or another location and removing unfused powder from cavity 434. In some embodiments, mini-horn array 450 may be formed a similar method as mini-horn array 350, but with apertures formed in the enclosure 452 by the 3D technique to allow unfused powder to be removed. For such embodiments, the drilled holes or apertures may be later filled with a patch or patches 456 by welding, brazing, applying an epoxy, or another suitable technique to reseal enclosure 452 and its cavity 434. Thus, enclosure 452 of mini-horn array 450 is formed from fused powder and from additional material. In this way, enclosure 452 becomes an opening-free enclosure subsequent to 3D printing. In various embodiments, cavity 434 of enclosure 452 may be filled with air or a selected gas, liquid, gel, or another substance. Mini-horn array 450 may be built directly onto cap body of a front cap by a 3D printing technique, or array 450 may be formed by a 3D printing technique and be subsequently attached to a front cap body by a different, suitable technique, as described above with respect to array 350.

Figure 10:
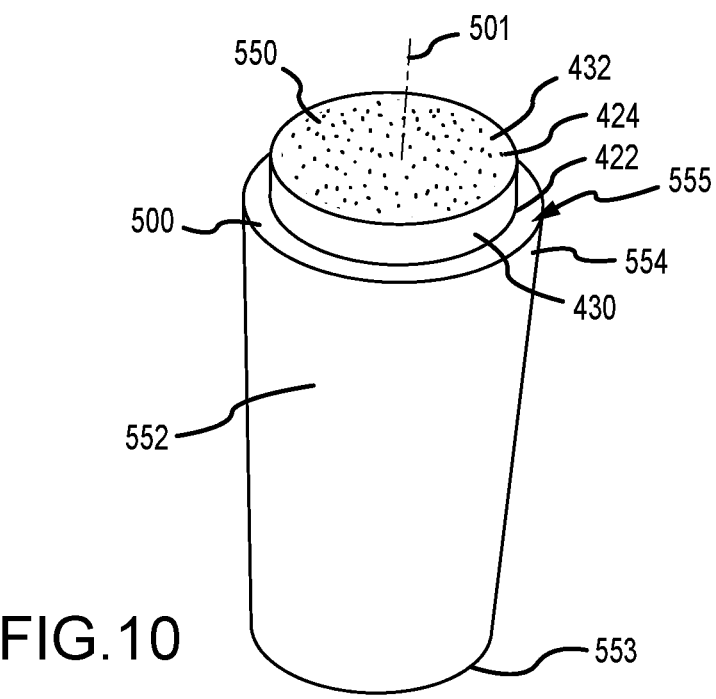
FIG. 10 is a perspective view shows a partially completed front cap with a mini-horn array during a stage of fabrication, in accordance with principles disclosed herein.

FIG. 10 is an example of building a mini-horn array directly on a front cap body using a 3D printing technique.

In FIG. 10, a cylindrical, a partially completed front cap 500 extends along a longitudinal axis 501 and includes a mini-horn array 550 fabricated directly on a solid piece of cylindrical stock material 552 by a 3D printing technique. Stock material 552 extends from a first end 553 to a second end 554, which includes an end surface 555, which extends radially. Mini-horn array 550 includes the same features as mini-horn array 350 of FIG. 7 and FIG. 8. As examples, array 550 includes a back plate 422, annular wall 430, and a front plate 424 that form an opening-free enclosure 432. Although not shown in FIG. 10, enclosure 432 includes closed cavity contains a plurality of horns surrounded by unfused powder that is sealed within enclosure 432. The powder used to form the solidified array 550 and the unfused powder within array 550 maybe a powdered version of the same material as the solid stock material 552, or a different material may be used.

In FIG. 10, the exposed surfaces of mini-horn array 550 are rough due to the 3D printing technique that was utilized in this example, and stock material 552 for the cap body is oversized, having a larger diameter than array 550. To convert partially completed front cap 500 to a finished front cap 342, mini-horn array 550 may be gripped in the chuck of a lathe, for example, so that stock material 552 may be machined into a cap body 404 (FIG. 7). In the process, the stock material 552 of FIG. 10 is to be machined to a correct diameter or diameters, which include enlarged section at end with a plurality of external grooves. If stock material 552 is not initially concentric with array 550, the machining process will resolve this issue as well. A bore or cylindrical chamber (e.g. chamber 410 of FIG. 7) is to be added through a majority of the axial length of material 552. After machining the stock material 552, it may be gripped and the outer surface of mini-horn array 550 may be machined to become smooth and to achieve a selected diameter and a selected wall thickness for front plate 424. When formed as described with respect to FIG. 10, cap 342 of FIG. 7 is a monolithic structure that includes multiple portions of material formed by different manufacturing methods. For this embodiment, cap 342 includes body 404 formed by traditional machining and mini-horn array 350 formed by 3D printing.

In some embodiments of FIG. 10, stock material 552 includes a bore or cylindrical chamber 410 (e.g., FIG. 7) extending inward from first end 553 toward end 554 or includes other features of front cap body 404 prior to adding mini-horn array 550. In some embodiments, a mini-horn array is built directly on a fully-formed front cap body 404 by a 3D printing technique, and may be machined to match the outer diameter of the cap body 404.

Figures 11, 12:
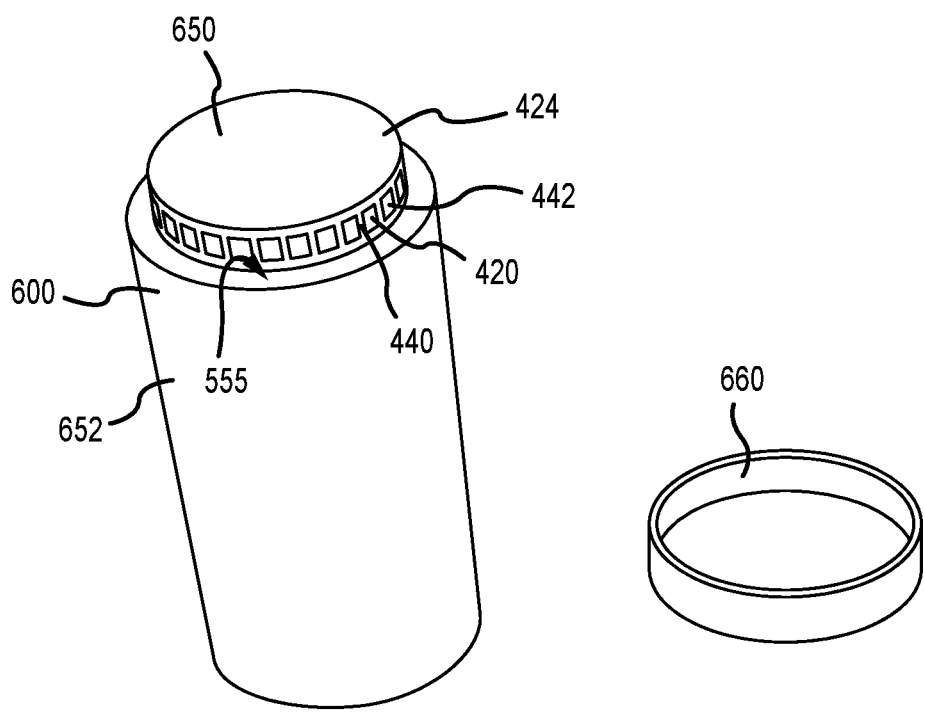
FIG. 11 shows a perspective view of a partially completed front cap with a partially completed mini-horn array during another stage of fabrication, the assembly including a mini-horn array in accordance with principles disclosed herein.
FIG. 12 shows a perspective view of a ring 660 suitable for forming an annular wall around the front cap assembly of FIG. 11.

FIG. 11 demonstrates the opportunity to fabricate a mini-horn array using 3D printing to create a portion of an enclosure with horns inside and later add the remaining portion of the enclosure after the 3D printing process/technique is completed. FIG. 11 shows a partially completed front cap 600 having a portion of a mini-horn array 650 fabricated directly on an end surface 555 of a piece of cylindrical stock material 652 by a 3D printing technique. At this stage in the process, array 650 includes a back plate 422, a front plate 424, and a plurality of horns 420 without an annular side wall around the horns. In this example, unfused powder has been removed from between the horns. FIG. 12 shows a ring 660 that may be installed around plates 422, 424 and horns 420 of front cap assembly 600 in FIG. 11 to form an annular wall and complete the mini-horn array 650. The placement or attachment of ring 660 may be performed by cooling the partially completed front cap 600 or heating ring 660 to slide or press the ring 660 into place. In some examples, the attachment of ring 660 may be performed by welding, brazing, applying an epoxy, diffusion bonding, or another suitable process. The resulting embodiment may be machined on a lathe, for example, to form a front cap like front cap 342 in FIG. 7, but lacking unfused powder. When formed as described with respect to FIGS. 11 and 12, the front cap is a monolithic structure that includes multiple portions of material formed by different manufacturing methods. For this embodiment, the front cap includes a body 404 (FIG. 7) formed by traditional machining and a mini-horn array 650 formed by 3D printing.

Ring 660 may be fabricated by machining, by forging, by casting, as examples. In some embodiments, ring 660 is be fabricated from a solid piece material. In some embodiments, ring 660 is be fabricated by a 3D printing technique, separately from the portion of a mini-horn array 650 shown in FIG. 11.

Figure 13:
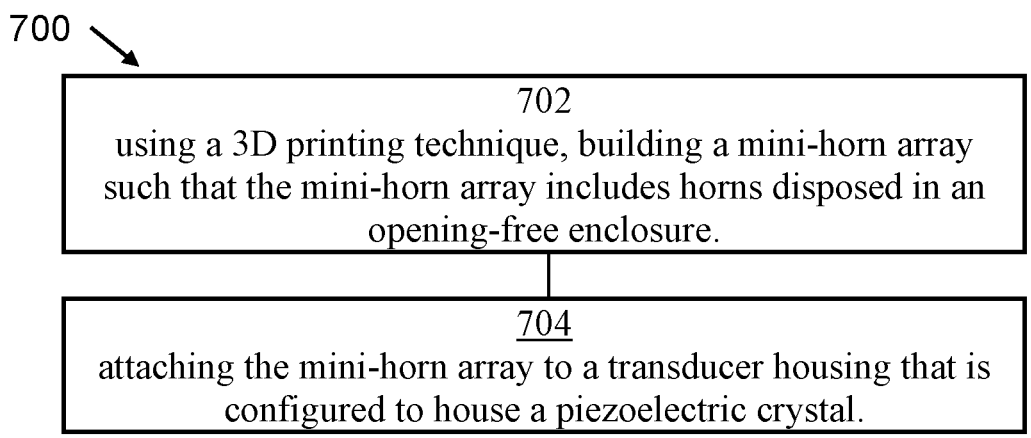
FIG. 13 shows a flow diagram showing a method for fabricating a mini-horn array using a 3D printing technique in accordance with principles disclosed herein.

FIG. 13 shows a method 700 for fabricating a mini-horn array in accordance with the principles described herein. At block 702, method 700 includes using a 3D printing technique, building a mini-horn array such that the mini-horn array includes horns disposed in an opening-free enclosure. Block 704 includes attaching the mini-horn array to a transducer housing that is configured to house a piezoelectric crystal.

Figure 14:
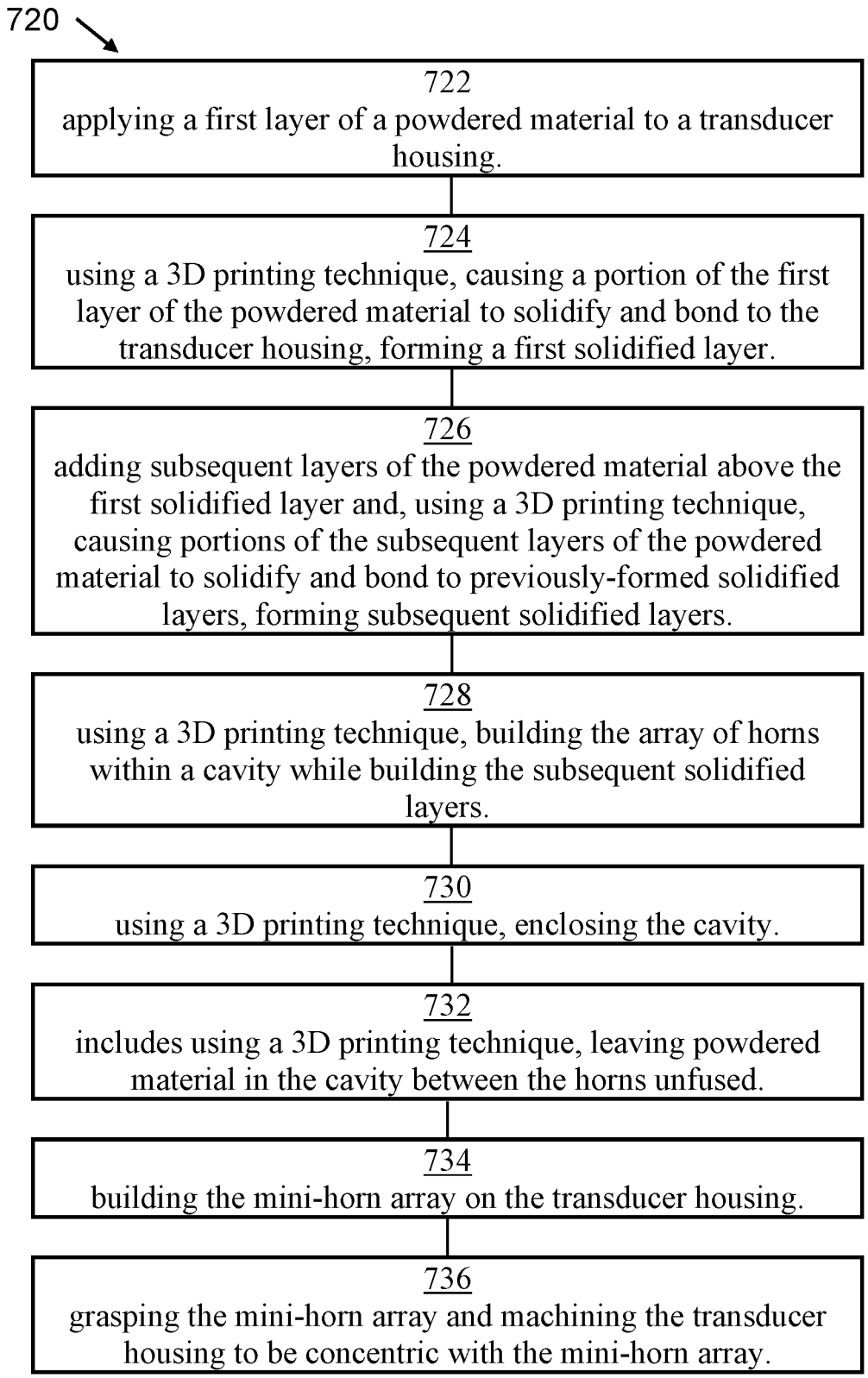
FIG. 14 shows another flow diagram showing a method for fabricating a mini-horn array using a 3D printing technique in accordance with principles disclosed herein.

FIG. 14 shows a method 720 for fabricating a mini-horn array in accordance with the principles described herein. Block 722 includes applying a first layer of a powder to a transducer housing. Block 724 includes using a 3D printing technique, causing a portion of the first layer of the powder to solidify and bond to the transducer housing, forming a first solidified layer. Block 726 includes adding subsequent layers of the powder above the first solidified layer and, using a 3D printing technique, causing portions of the subsequent layers of the powder to solidify and bond to previously-formed solidified layers, forming subsequent solidified layers. Block 728 includes using a 3D printing technique, building the array of horns within a cavity while building the subsequent solidified layers. Block 730 includes using the 3D printing technique, enclosing the cavity.

At block 732, method 720 includes using the 3D printing technique, leaving powder in the cavity between the horns unfused, e.g., loose. Block 734 includes building the mini-horn array on the transducer housing using the 3D printing technique. In some embodiments of the method, the mini-horn array is round and is built onto the transducer housing concentric with the housing. In some embodiments, mini-horn array is not concentric with the housing when built onto the transducer housing. Block 736 includes grasping the mini-horn array and machining the transducer housing to be concentric with the mini-horn array.

For some implementations, various blocks of method 720 may be applied within method 700. Some embodiments of methods 700, 720 may include fewer operations than described. Some embodiments of methods 700, 720 may include additional operations based on other concepts presented elsewhere in this specification, including the associated figures. For example, in some embodiments, method 700, 720 includes building the mini-horn array on a piece of stock material that is not built by a 3D printing technique. In some embodiments the method includes machining the piece of stock material to form a portion of the transducer housing.

While exemplary embodiments have been shown and described, modifications thereof can be made by one of ordinary skill in the art without departing from the scope or teachings herein. The embodiments described herein are exemplary only and are not limiting. Many variations, combinations, and modifications of the systems, apparatuses, and processes described herein are possible and are within the scope of the disclosure. Accordingly, the scope of protection is not limited to the embodiments described herein, but is only limited by the claims that follow, the scope of which shall include all equivalents of the subject matter of the claims. The inclusion of any particular method step or operation within the written description or a figure does not necessarily mean that the particular step or operation is necessary to the method. The steps or operations of a method listed in the specification or the claims may be performed in any feasible order, except for those particular steps or operations, if any, for which a sequence is expressly stated. In some implementations two or more of the method steps or operations may be performed in parallel, rather than serially.

What is claimed is:

1. An ultrasonic flow meter, comprising:
   a meter body;
   a passage in the meter body for conducting flow of a fluid stream that is to be metered;
   a pair of ultrasonic transducers coupled to the meter body, the transducers configured to form a chordal path across the passage between the transducers, each transducer comprising:
   a transducer housing;
   a piezoelectric crystal disposed within the transducer housing; and
   a mini-horn array coupled to the transducer housing, the mini-horn array comprising:
   an opening-free enclosure;
   a closed cavity inside the enclosure, the cavity having a proximal end surface and a distal end surface; and
   a plurality of horns enclosed within the closed cavity, wherein the horns include a horn base portion adjacent to the proximal end surface of the cavity and a horn neck portion that extends from the horn base portion in a direction away from the piezoelectric crystal and towards the distal end surface of the cavity, wherein the horn neck portions are separated by spaces within the cavity.

2. The ultrasonic flow meter of claim 1 further comprising powder in the cavity between the horns.

3. The ultrasonic flow meter of claim 2 wherein the enclosure comprises a first material and wherein the powder comprises the first material in a powdered form.

4. The ultrasonic flow meter of claim 1 wherein the powder fills the spaces between the horns in the cavity.

5. The ultrasonic flow meter of claim 4 wherein the enclosure comprises a first material and wherein the powder comprises the first material in a powdered form.

6. The ultrasonic flow meter of claim 1 wherein the mini-horn array is made by a 3D printing technique.

7. The ultrasonic flow meter of claim 6 wherein the opening-free enclosure is sealed by the 3D printing technique.

8. The ultrasonic flow meter of claim 6 wherein the housing comprises a tubular stalk, a front cap at a leading end of the stalk, and a transducer retainer coupled at the trailing end of the stalk; and
   wherein the front cap includes a tubular body and
   wherein the mini-horn array is formed directly on the tubular body by 3D printing.

9. A method of making an ultrasonic transducer comprising:
　using a 3D printing technique, building a mini-horn array such that the mini-horn array includes horns disposed in an opening-free enclosure and
　attaching the mini-horn array to a transducer housing that is configured to house a piezoelectric crystal.

10. The method of claim 9 wherein using the 3D printing technique and attaching the mini-horn array to the transducer housing comprise:
　applying a first layer of a powder to the transducer housing;
　causing a portion of the first layer of the powder to solidify and bond to the transducer housing, forming a first solidified layer;
　adding subsequent layers of the powder above the first solidified layer and causing portions of the subsequent layers of the powder to solidify and bond to previously-formed solidified layers, forming subsequent solidified layers;
　building the array of horns within a cavity while building the subsequent solidified layers; and
　enclosing the cavity using the 3D printing technique.

11. The method of claim 10 wherein using a 3D printing technique comprises: leaving powder in the cavity between the horns unfused.

12. The method of claim 10 wherein the mini-horn array is round and is built onto the transducer housing concentric to the housing.

13. The method of claim 10 wherein using the 3D printing technique comprises and attaching the mini-horn array to the transducer housing comprise:
　building the mini-horn array on the transducer housing;
　wherein the method further comprises:
　　grasping the mini-horn array and
　　machining the transducer housing to be concentric with the mini-horn array.

14. The method of claim 9 wherein using the 3D printing technique and attaching the mini-horn array to the transducer housing comprise:
　building the mini-horn array on a piece of stock material that is not built by the 3D printing technique and
　machining the piece of stock material to form a portion of the transducer housing.

15. A transducer assembly for use in an ultrasonic flow meter, the ultrasonic transducer comprising:
　a transducer housing comprising a first end, a second end, and a channel extending between the first and second ends, and a mini-horn array spaced apart from the channel and extending to the first end; and
　a piezoelectric crystal disposed within the channel proximal the first end of transducer housing;
　wherein the mini-horn array is built by a 3D printing technique, the array comprising:
　　an opening-free enclosure;
　　a plurality of horns disposed within the enclosure; and
　　powder disposed in the enclosure between the horns; and
　wherein the opening-free enclosure is sealed by the 3D printing technique, retaining the powder inside the cavity.

16. The transducer assembly of claim 15 wherein the transducer housing comprises a front cap having a tubular cap body, and the channel extends into the cap body and
　wherein the mini-horn array is formed directly on the cap body by the 3D printing technique.

17. The transducer assembly of claim 16 wherein the cap body is not fabricated by a 3D printing technique.

18. The transducer assembly of claim 15 wherein the enclosure includes a back plate, a front plate spaced apart from the back plate, and a wall extending from the back plate to the front plate and
　wherein the back plate, the front plate, the wall, and horns are built by the same 3D printing technique.

19. The transducer assembly of claim 15 wherein the housing comprises a front cap extending from the first end, a tubular stalk sealingly engaging the front cap, a transducer retainer coupled to the stalk and extending to the second end;
　wherein the front cap includes a tubular cap body formed from stock material that is not made by 3D printing;
　wherein the channel extends into the tubular cap body; and
　wherein the mini-horn array is formed directly on the tubular body by the 3D printing technique.

* * * * *